United States Patent [19]
Meilinger et al.

[11] Patent Number: 5,470,593
[45] Date of Patent: Nov. 28, 1995

[54] PROCESS FOR THE MANUFACTURE OF A FAT FREE CREAM CHEESE PRODUCT

[75] Inventors: John H. Meilinger; C. Gordon Brown, both of St. Louis; Montgomery A. Bohanan, Grover, all of Mo.

[73] Assignee: Raskas Foods Inc., Clayton, Mo.

[21] Appl. No.: 199,622

[22] Filed: Feb. 22, 1994

[51] Int. Cl.$^6$ .................................. A23C 19/076
[52] U.S. Cl. .................. 426/36; 426/38; 426/42; 426/43; 426/582; 426/654
[58] Field of Search .................. 426/36, 38, 42, 426/43, 582, 654

[56] References Cited

U.S. PATENT DOCUMENTS

| | | |
|---|---|---|
| 2,160,159 | 5/1939 | Lundstedt et al. . |
| 2,387,276 | 10/1945 | Link . |
| 3,852,158 | 12/1974 | Anderson et al. ............ 426/43 |
| 3,929,892 | 12/1975 | Hynes et al. . |
| 4,244,983 | 1/1981 | Baker . |
| 4,379,175 | 4/1983 | Baker . |
| 4,724,152 | 2/1988 | Baker et al. . |
| 4,968,512 | 11/1990 | Kharrazi . |
| 5,079,024 | 1/1992 | Crane . |
| 5,108,773 | 4/1992 | Smith et al. . |
| 5,180,604 | 1/1993 | Crane et al. . |
| 5,215,778 | 6/1993 | Davison et al. . |
| 5,395,630 | 3/1995 | Gamay ............................ 426/39 |

*Primary Examiner*—Helen Pratt
*Attorney, Agent, or Firm*—Banner & Allegretti, Ltd.

[57] ABSTRACT

A process and apparatus are provided for preparing a low fat or fat free cream cheese which approximates the flavor and consistency of traditional full fat cream cheese. According to the process of the invention, a pasteurized mixture comprising skim milk fortified with nonfat dry milk is inoculated with a bacterial starter culture containing acid-producing and flavor-producing organisms. The inoculated mixture is then fermented at a temperature ranging between about 68° F. and about 110° F. until the mixture reaches a pH 4.5 and 5.5. Thereafter, the fermented mixture is cooled to 40° F. and held at that temperature for a period ranging between about 48 and about 96 hours. The resulting mixture is then blended with dry cottage cheese curd or cultured skim milk curd, a stabilizing hydrocolloid and other dried ingredients. The resulting fat free cream cheese product has a water content ranging between about 70% wt. and 77% wt., a pH level ranging between about 4.7 and about 5.3, and lactose in an amount ranging between about 5.0% wt. and about 9.0% wt. A low fat cream cheese product having a butterfat content of about 2.5–3.0% wt. may be produced by substituting cream having a butterfat content of about 6.5% wt. in place of the nonfat milk.

19 Claims, 1 Drawing Sheet

PROCESS FOR THE MANUFACTURE OF A FAT FREE CREAM CHEESE PRODUCT

FIELD OF THE INVENTION

This application relates to a process and apparatus for manufacture of a low fat or fat free cream cheese which exhibits the flavor and texture of traditional full fat cream cheese.

BACKGROUND OF THE INVENTION

Cream cheese is a spreadable, mild, uncured cheese which is distinguished from other cheese varieties in terms of its flavor and spreadability. The distinctive flavor of traditional cream cheese, referred to as a "cultured" or "diacetyl" flavor, is derived from fermentation of cream and milk with a bacterial starter culture containing two types of organisms which produce lactic acid (lactococcus organisms) and flavor compounds (leuconostoc and diacetylactis organisms). Butterfat, in a minimum amount of 33% by weight, is required in traditional cream cheese to enhance the cultured flavor and to provide a rounder, fuller flavor in the final product. Furthermore, butterfat is mostly responsible for the soft spreadability characteristics of traditional cream cheese. A process for manufacture of traditional cream cheese is described in U.S. Pat. No. 2,387,276.

Increased consumer health awareness has generated a demand for dairy products having less butterfat and fewer calories than their traditional counterparts. In response, the dairy industry has developed a number of processes to produce low fat or nonfat dairy products including cream cheese products. See, for example, U.S. Pat. Nos. 4,724,152 and 3,929,892 for process for the manufacture of low fat cream cheese and 5,079,024 and 5,180,604 for processes for the manufacture of fat free cream cheese. While the aforementioned processes are useful in producing low-fat or fat free cream cheese products, these processes could be improved.

Conventional processes for producing low fat or fat free cream cheese products suffer from a number of deficiencies. One major deficiency is that these processes generally produce products which fail to approximate the flavor and texture of traditional cream cheese. Moreover, complicated, cumbersome and inefficient apparati are typically employed to accommodate the extensive mixing, shearing and heating steps required in these processes. U.S. Pat. No. 5,079,024, for example, describes a process for manufacturing a fat free cream cheese product which requires an apparatus which includes two homogenizers as well as three separate mixing vessels in sequence. These vessels provide a specific degree of agitation and shear at successive points in the process. Similarly, U.S. Pat. No. 5,180,604 describes a process for making a fat free cream cheese in an apparatus which requires only one vessel. The apparatus, however, is severely limited with respect to the amount of product produced per batch. Accordingly, there is a need in the art for an efficient process and apparatus for producing a low fat or fat free cream cheese product which closely resembles traditional cream cheese in flavor and texture.

SUMMARY OF THE INVENTION

The present invention relates to a process and apparatus for the manufacture of a low fat or fat free cream cheese which exhibits the flavor and texture of traditional full fat cream cheese.

According to this invention, a pasteurized mixture of skim milk fortified with nonfat dry milk or hydrated dry skim milk is inoculated with a dairy starter culture having acid- and flavor-producing organisms and the inoculated mixture is fermented until it reaches a pH ranging between about 4.7 and about 5.0 and has a titratable acidity ranging between about 1.2% and about 1.6%. Thereafter, the fermented mixture is transferred into a processing vessel, cooled to about 40° F. and held at this temperature for a period ranging between about 48 and about 96 hours to produce a flavor-rich precheese base. It has been discovered that by fermenting the mixture to the aforementioned pH and acidity ranges and by holding the fermented mixture at the aforementioned temperature and periods, a fat free cream cheese product can be produced which has a cultured flavor similar to that of traditional cream cheese.

Thereafter, the precheese base is transferred into a liquefying vessel and cottage cheese curd (or other cultured skim milk solids) and an emulsifying salt are then blended into the precheese base. The mixture is held for approximately 30 minutes at a temperature ranging between about 40° and about 80° F. The product is then heated to about 160° F. and a stabilizing hydrocolloid, e.g., xanthan gum, in an amount ranging between about 0.2% wt. and about 2.0% wt. is added. The resulting mixture is sheared, heated to about 180° F., and additional additives such as favoring, texturing and antimycotic agents are blended into the mixture. After all ingredients are properly blended, the product is homogenized, packaged, and refrigerated.

The nonfat cream cheese product produced by the process of the present invention possesses a flavor and texture very similar to that of traditional full-fat cream cheese and is high in water soluble solids, e.g. lactose. High amounts of water soluble solids are desirable for promoting and enhancing the spreadability of fat free cream cheese and for providing a texture which closely resembles traditional full fat cream cheese. If desired, a low fat cream product having a butterfat content of about 2.5% wt. to 3.0% wt. may be produced by the inventive process by replacing the nonfat milk with cream having a butterfat content of about 6.5% wt.

The process of the present invention preferably employs a simple and economical two-vessel apparatus which provides the necessary mixing, shearing, and heating processing steps without significantly sacrificing the amount of product produced per batch.

Accordingly, it is an object of the invention to provide a process for the manufacture of a low fat or fat free cream cheese product with a cultured flavor and spreadability which closely resembles traditional full fat cream cheese.

It is another aim of the present invention to provide a simple apparatus for manufacture of a low fat or fat free cream cheese product which provides the necessary mixing, shearing, and heating without significantly sacrificing the amount of product produced per batch.

These and other objectives of the invention will be apparent in light of the detailed description below.

DETAILED DESCRIPTION OF THE INVENTION

Figure 1:
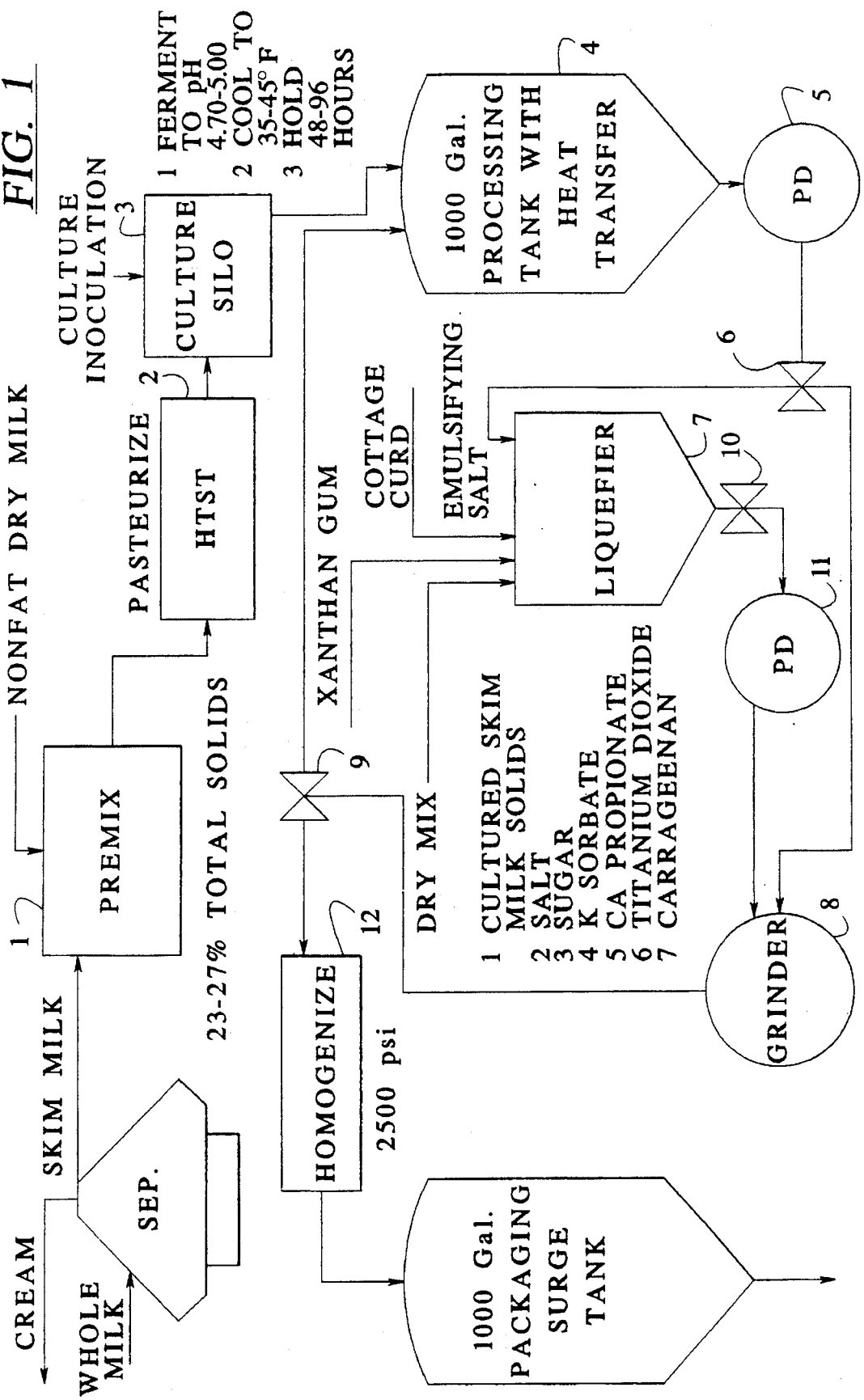
FIG. 1 illustrates the inventive process for making a low fat or fat free cream cheese which employs an apparatus comprising a processing tank (4) and a liquefier tank (7). The processing tank (4), which also functions as a product reservoir, is connected via conduits to the liquefier tank (7) which blends precheese base with additional ingredients and serves as a high shear point during low fat cream cheese manufacture.

All patents referred to in this application are incorporated by reference in their entirety.

According to the present invention as illustrated in FIG. 1, a precheese base may be prepared by passing whole milk through a separator and fortifying the resultant skim milk with nonfat dry milk to obtain a nonfat milk mixture having a dry solids content ranging between about 23% wt. and about 27% wt. (1), preferably about 24.5% wt., based on the weight of the mixture. Alternatively, nonfat dry milk, hydrated with water to achieve the aforementioned dry matter range, may be used in place of the fortified skim milk mixture. The mixture is then pasteurized (2), cooled to a temperature ranging between about 68° F. and about 78° F., preferably between about 72° F. and about 74° F.

The cooled mixture is then transferred to a culture silo (3) and inoculated with a dairy bacterial starter culture such as that typically used in cream cheese manufacture. Suitable but non-limiting examples of bacterial starter cultures are described, for example, in Gilliland, S. E. (ed.), 1985, *Bacterial Starter Cultures for Foods*, CRC Press, Boca Raton, Fla. Bacterial starter cultures are available from a number of commercial sources such as Quest International, Sarasota, Fla.; Rhone-Poulenc, Madison, Wis.; Chr. Hansen's Laboratory, Inc., Milwaukee, Wis.; Pfizer, Inc., Milwaukee, Wis.; and Sanofi Bio-Industries, Waukesha, Wis. In practicing this invention, conventional dairy starter cultures containing an acid producing organism (*Lactococcus lactis* subsp. *lactis; Lactococcus lactis* subsp. *cremoris; Streptococcus thermophilus*) and at least one species of flavor-producing organisms (*Leuconostoc mesenteroides* subsp. *cremoris, Leuconostoc lactis* and *Lactococcus lactis* subsp. *lactis* biovar diacetylactis) are used. The ratio of acid-producing organisms to flavor producers may vary accordingly depending on preference, however, the ratio generally ranges between about 75% and about 85% acid producers to about 15% and about 25% flavor producers. In practicing this invention, the preferred dairy starter culture contains *Lactococcus lactis* subsp. *cremoris; Leuconostoc mesenteroides* subsp. *cremoris*; and *Lactococcus lactis* subsp. *lactis* biovar diacetylactis.

The inoculated mixture is then incubated at a temperature ranging between about 68° F. and about 110° F., preferably between about 72° F. and about 74° F., until the pH of the mixture drops to a pH value ranging between about 4.5 and about 5.5, preferably between about pH 4.7 and about pH 5.0. At pH values below 5.7, the flavor-producing organisms are most active and produce substantial amounts of desirable flavoring compounds. The fermentation time will vary according to the dry solids content of the nonfat milk as this will affect the buffer capacity of the base. In general, the fermentation time ranges between about 12 and about 28 hours, usually between about 16 and about 24 hours when the nonfat milk dry solids content ranges between about 23% wt. and about 27% wt.

Once the fermented mixture reaches a value within the aforementioned pH range, the resulting fermented precheese base is cooled to a temperature ranging between about 34° F. and about 50° F., preferably ranging between about 35° F. and about 45° F., and held, without agitation for a minimum period ranging between about 48 and about 96 hours. In practicing this invention, it is preferred that the cooled, fermented precheese base be held for a period ranging between about 72 and about 96 hours to allow sufficient time for the flavor-producing organisms to generate flavor compounds. Thereafter, the fermented precheese base is transferred from the culture silo (3) to a processing tank (4).

The processing tank (4) has agitation as well as heating and cooling capabilities and a general capacity ranging between about 500 and about 2,000 gallons, usually ranging between about 500 and about 1000 gallons. For economic reasons, processing tanks smaller than 500 gallons are not normally used. As shown in FIG. 1, processing tank (4) is connected via conduit to a positive displacement pump (5) which in turn is connected to a conduit valve (6) which, by adjustment, will allow the product to pass via conduit either to a jacketed liquefier tank (7), or to a high shear grinding pump (8). If valve (6) is positioned such that product passes via conduit directly from the processing tank (4) to the high shear grinding pump (8), the product may be allowed to bypass the liquefier tank (7) and return to the processing tank (4) via conduit by proper positioning of valve (9). Product may also be allowed to pass via conduit directly from the liquefier tank (7) to the high shear grinding pump (8) by opening valve (10) and activating positive displacement ("PD") pump (11).

In practicing the process of the present invention, processing of the product or its intermediates, e.g., agitation, shearing, heating, or cooling, may be achieved by simply recirculating the material between the processing tank (4) to the liquefier tank (7) via a recirculation loop comprised of processing tank (4), PD pump (5), valve (6), liquefier tank (7), valve (10), PD pump (11), high shear grinding pump (8) and valve (9). A number of benefits can be obtained by the two-vessel apparatus of the present invention. By allowing the processing tank to serve as the product reservoir, the liquefier may function as a high shear point in the recirculation loop rather than the product reservoir itself. Thus, proper shearing, agitation, and temperature control can be achieved without sacrificing the size of the batch being processed. Additionally, the apparatus eliminates the need for multiple liquefying vessels thus reducing capital investment.

The apparatus of the invention employs processing and liquefier tanks which are typically used in cream cheese manufacture. These tanks are generally stainless steel mixing vessels which are fitted with temperature control means, e.g., water or steam jackets, and with agitation means which imparts high shear. Suitable processing tanks may be purchased from Walker (New Lisbon, Wis.), APV Crepaco (Lake Mills, Wis.), Cherry Burrell (Louisville, Ky.), and Mueller (Springfield, Mo.). A preferred processing tank for use in the invention is Walker (model no. P/Z-K/T-34). The liquifier tanks are preferably blender type mixers, e.g., a Breddo mixer (model no. LORWWSS, Breddo (Kansas City, Kans.)), such as the one described in U.S. Pat. No. 5,180,604. Other suitable liquifier tanks may be purchased from APV Crepaco, Mueller, Silverson (East Longmeadow, Mass.), and Stephan (Columbus, Ohio). Also, any type of positive displacement pumps and high shear grinding pumps can be used which would function equivalently. Representative grinding pumps include, but are not limited to, Waukesha (model no. SP4, Waukesha, Delavan, Wis.), Silverson, and Stephan. Non-limiting examples of PD pumps include Tri-Clover (model no. TSR5NLD-30MDUOW-A, Tri-Clover, Kenosha, Wis.), APV Crepaco, Bran & Luebbe (Buffalo Grove, Ill.), Fristam (Middleton, Wis.), and Waukesha. The selection of valves is not critical to the invention and any shape of the conduits are not critical to the invention, however the selection of the appropriate conduit depends on consideration of the type of pump used, the flow rate and type of valve used.

The fermented precheese is introduced into the processing tank (4) in an amount generally ranging between about 25% wt. and about 55% wt., preferably between about 35% wt. and about 45% wt., based on the weight of the final product, and is recirculated via conduits through pump (5), valve (6), the liquefier tank (7), valve (10), positive displacement high shear pump (11), high shear grinding pump (8), and valve (9) and back into processing tank (4). Recirculation is generally performed at a temperature ranging between about 40° F. and about 70° F., preferably between about 45° F. and about 50° F. As recirculation proceeds, dry cottage cheese curd is added into the liquefier tank (7) in an amount ranging between about 30% wt. and about 70% wt., preferably between about 40% wt. and about 60% wt., based on the weight of the final product. If desired, an equivalent amount of cultured skim milk curd may be used as a substitute for cottage cheese curd. In practicing this invention, the high shear grinding pump (8) operates at a speed sufficient to thoroughly comminute the cottage cheese curd.

After the curd has been sufficiently comminuted, an emulsifying salt is introduced into the liquefier tank (7) and recirculation of the mixture proceeds for a time ranging between about 3 minutes and about 15 minutes, preferably about 5 minutes. The emulsifying salt is one that is typically used in the manufacture of processed cheese such as sodium citrate, sodium tripolyphosphate, or disodium phosphate. A particularly preferred emulsifying salt is sodium tripolyphosphate. The emulsifying salt is added in an amount generally ranging between about 0.25% wt. and about 2.0% wt., preferably ranging between about 0.50% wt. and about 1.00% wt., based on the weight of the final product. After about five minutes, the recirculation loop is shut off and the mixture is allowed to sit quiescently for a period ranging between about 15 and about 60, preferably about 30 minutes, so as to allow the emulsifying salt to interact with the protein.

After the period of quiescence, the PD pumps (5) and (11) as well as the high shear grinding pump (8) and the liquefier tank (7) are started and recirculation of the product recommences. During this recirculation period, the jackets of the liquefier tank (7) and processing tank (4) serve to heat the product to a temperature ranging between about 140° F. and about 180° F., preferably about 160° F., at a heating rate of about 2°–3° F./min. If desired, optional ingredients such as coloring agents and vitamins may be added during the initial heat-up phase. Vitamin A, in a suitable form, e.g. a palmitate salt, is preferably added to the recirculating mixture to restore the vitamin A level in the product to the level which is typically found in regular cream cheese.

When the temperature of the recirculating product reaches 160° F., a predetermined amount of a stabilizing hydrocolloid is added at the liquefier tank (7). Suitable, but non-limiting, examples of stabilizing hydrocolloids include modified food starch, carrageenan, guar gum, xanthan gum, agar, alginate, and locust bean gum. A particularly preferred stabilizing hydrocolloid is xanthan gum. The amount of stabilizing hydrocolloid used broadly ranges between about 0.20% wt. about 2.0% wt., preferably ranging between about 0.50% wt. and about 1.00% wt., based on total weight of the mixture. After all of the stabilizer is added, the grinding pump (8) and the liquefier tank (7) are adjusted to provide a shearing rate and mixing speed, respectively, sufficient to cause the product to thicken and take on the appearance of bread dough while recirculation of the product proceeds for an additional period ranging between about 4 and about 12 minutes. The liquefier mixing speed generally ranges between about 1600 and about 3600 rpm, preferably about 2400 rpm while the grinding pump (8) shearing speed generally ranges between about 2400 and about 3600 rpm, preferably about 3600 rpm. Thereafter, the grinding pump (8) and liquefier tank (7) are turned to a relatively low speed as heating of the product recommences until the temperature reaches a value ranging between about 165° F. and about 190° F., preferably about 180° F. The liquefier low speed ranges between about 800 and about 1800 rpm, preferably about 1200 rpm while the grinding pump low speed ranges between about 1200 and about 1800 rpm, preferably about 1800 rpm.

Concomitant with the second heating period, additional ingredients such as food preservatives and dispersing agents are then added to the recirculating product at the liquefier tank (7). Suitable, but non-limiting, examples of additives include salt (e.g., sodium chloride); sugar (e.g., sucrose); texturizing agents such as titanium dioxide, tricalcium phosphate or modified food starch; stabilizing hydrocolloids (as thickening agents) such as modified food starch, carrageenan, agar, alginate or locust bean gum; food preservatives such as calcium propionate, potassium sorbate or sorbic acid; sweeteners such as corn syrup or dextrose; and milk solids such as buttermilk solids, nonfat dry milk solids, or whey solids. These ingredients, in dry form, can be added separately or preferably as a mixture. When carrageenan is used, however, it is preferably added last and as a separate ingredient. The Table below lists the preferred additives as well as general and preferred amounts used relative to the total weight of the final product:

| PREFERRED DRY INGREDIENT | % WT. OF FINAL PRODUCT | |
| --- | --- | --- |
| | Preferred Ranges | General Ranges |
| Buttermilk solids | 1.0–5.0 | 0–10.0 |
| Salt | 0.2–1.0 | 0.2–2.0 |
| Sugar | 0.2–1.1 | 0.2–2.0 |
| Potassium sorbate | 0.05–0.1 | 0.05–0.2 |
| Calcium propionate | 0.05–0.1 | 0.05–0.2 |
| Titanium dioxide | 0.2–1.0 | 0.2–1.0 |
| Carrageenan | 0.05–0.3 | 0.05–1.0 |

After all the dry ingredients are added and thoroughly blended into the recirculating product, valves (9) and (6) are repositioned, and the product is finally passed through the homogenizer (12) and homogenized at a total pressure of about 2500 psi. After homogenization, the final product is transferred to a surge tank, packaged, and cooled.

The resulting fat free cream cheese product has a water content generally ranging between about 70% wt. and about 77% wt., usually between about 72% wt. and about 75% wt., and a pH value ranging between about 4.7 and about 5.3, preferably between about 4.9 and about 5.1. The final product is preferably acidic so as to discourage the potential growth of contaminants such as yeast, mold, and some pathogens due to the relatively high water content of the product relative to traditional cream cheese.

The final product preferably also has a high percentage of water-soluble solids. Water-soluble solids contribute to the spreadability of fat free cream cheese and provide a texture which closely resembles traditional full fat cream cheese.

The final product generally has a water-soluble solid content ranging between about 8.0% wt. and about 14.0% wt., preferably between about 10.0% wt. and about 12.5% wt. Lactose, the main component of the water-soluble solids, is generally present in the final product in an amount ranging between about 5.0% wt. and about 9.0% wt., preferably between about 6.0% wt. and about 8.0% wt.

The following example illustrates the invention but does not serve to limit its scope.

EXAMPLE 1

PREPARATION OF FAT FREE CREAM CHEESE BY THE INVENTIVE PROCESS

In this Example, fat free cream cheese having high levels of lactose was prepared by the process of the present invention. The target range for lactose in this example is 5.00% wt. to 8.00% wt., based on the weight of the final product.

Whole milk (9,466 lbs.) was separated into cream and skim milk using a mechanical skim separator. The separated skim milk (8,600 lbs.) was then fortified with nonfat dry milk to a solids content of 26.5% wt., and the resulting mixture was pasteurized then cooled to 73° F. The resulting material (10,750 lbs.) was then transferred into a culture silo. A commercial dairy starter culture containing *Lactococcus lactis* subsp. *cremoris*, *Leuconostoc mesenteroides* subsp. *cremoris*, and *Lactococcus lactis* subsp. *lactis* biovar diacetylactis (2% wt.) was added to the skim milk mixture and fermentation was allowed to proceed at 72° F. until the pH reaches 4.9. This process took about 21 hours. Thereafter, the fortified skim milk was cooled to 40° F. and was held at this temperature for 72 hours for proper flavor development. This resulted in a flavor-rich material which will be referred to here as a precheese base.

Precheese base (2520 lbs) was introduced into a 1000 gallon processing tank (4) (Walker, model P/Z-K/T-34) which was connected to a liquefier tank (7) (volume 300 gal., Breddo, model LORWWSS) and grinding pump (8) (Waukesha, model SP4) in a recirculating loop configuration as shown in FIG. 1. The liquefier tank (7) and grinding pump (8) are turned on high speed (7) 2400 rpm, (8) 3600 rpm as recirculation of the precheese base commences. Dry cottage cheese curd (3000 lbs) having a total solids content of 20 wt % was then added at the liquefier tank (7). After all of the curd had been added, 48 pounds of sodium tripolyphosphate were added at the liquefier tank (7) and recirculation was allowed to proceed for five minutes to comminute the dry curd. Thereafter, the liquefier tank (7) and grinding pump (8) were turned off and the recirculation loop was shut down. The mixture was then allowed to sit quiescently for 30 minutes to allow the emulsifying salt to interact with the protein.

After the period of quiescence, the recirculation loop was restarted and the product was warmed to 160° F. by introducing warm water into the jackets of the liquefier tank (7) and processing tank (8). During the first heating period, annatto extract was added for color. Vitamin A palmitate was added to adjust the vitamin A level to that of regular cream cheese. Warming of the product was facilitated by setting the agitation speed of the liquefier tank (7) and processing tank (8) on low speed (approximately 1200 rpm). The grinding pump was also set on a low shear speed (approximately 1800 rpm) during this period.

After a temperature of 160° F. had been reached, the liquefier tank (7) agitation speed (approximately 2400 rpm) and grinding pump (8) shear speed (approximately 3600 rpm) were set. Forty-eight pounds of xanthan gum as stabilizing hydrocolloid were introduced into the liquefier tank (7) as recirculation proceeded with maximum agitation (liquefier tank (7) agitation speed=2400 rpm; grinding pump (8) shearing speed=3600 rpm; processing tank (4) agitation speed=30 rpm) for 8 minutes. During this period, the gum was activated and the product took on the appearance of bread dough. After gum activation, the liquefier tank (7) (1200 rpm) and grinding pump (8) (1800 rpm) were both turned to low speed as the product was heated a second time to 180° F. at a rate of approximately 2° F./min. As the product was being heated from 160° F. to 180° F., the following dry ingredients were added sequentially to the recirculating product at the liquefier tank (7):

| DRY INGREDIENT | POUNDS |
|---|---|
| Buttermilk solids | 120 |
| Salt | 36 |
| Sugar | 36 |
| Potassium Sorbate | 4.8 |
| Calcium Propionate | 4.8 |
| Titanium Dioxide | 30 |
| Carrageenan | 9 |

When the remaining dry ingredients had been thoroughly blended into the recirculating mixture and a temperature of 180° F. had been attained, the product was homogenized at a total pressure of 2500 psi and transferred to a surge tank for packaging.

The resultant fat free cream cheese product had a lactose content of 7.0% wt. which was significantly higher than other commercially available fat free products as shown in the table below:

| "Fat Free" Cream Cheese Product | Percent Lactose |
|---|---|
| Philadelphia "Philly Free" | 2.5 |
| Alpine Lace | 4.4 |
| Healthy Choice | 3.9 |

The higher level of water-soluble lactose imparted a smooth creaminess to the fat free cream cheese product and increased its resemblance to traditional cream cheese. The product produced in this example also had a pH of 4.9 which was lower than the pH of other fat free products as shown in the table below:

| "Fat Free" Cream Cheese Product | pH |
|---|---|
| Philadelphia "Philly Free" | 5.4 |
| Alpine Lace | 5.4 |

The product produced by the process described in this example exhibited a rich cultured flavor and a body and texture which closely resembled traditional cream cheese.

EXAMPLE 2

PREPARATION OF A LOW FAT CREAM CHEESE BY THE INVENTIVE PROCESS

In this example, the process described in Example 1 is repeated using cream at 6.5% wt. butterfat in place of skim milk in making the fermented precheese base. The low fat cream cheese product had a butterfat content of 2.5–3.0% wt.

What is claimed is:

1. A process for making a cultured fat-free cream cheese product comprising the steps of:

(a) inoculating a pasteurized mixture comprising non-fat milk, said pasteurized mixture having a solid matter content ranging between about 23% wt. and about 27% wt., with a dairy starter culture so as to form an inoculated mixture;

(b) fermenting said inoculated mixture at a temperature ranging between about 68° F. and about 110° F. so as to obtain a fermented mixture having a pH ranging between about 4.7 and about 5.0;

(c) cooling said fermented mixture to a temperature ranging between about 35° F. and about 45° F. and allowing said fermented mixture to sit at said temperature for a period ranging between about 48 and about 96 hours so as to produce a flavor-rich precheese base;

(d) introducing a predetermined amount of said precheese base into a processing tank (4), said processing tank (4) being connected to a liquefier tank (7) in a recirculation loop comprising a processing tank (4), positive displacement pump (5), valve (6), liquefier tank (7), valve (10), positive displacement pump (11), grinding pump (8), and valve (9);

(e) adding dry cottage cheese curd in an amount ranging between about 30% wt. and about 70% wt. and an emulsifying salt in an amount ranging between about 0.25% wt. and about 2.0% wt. into said liquefier tank (7) while recirculating said precheese base in said recirculating loop for a period ranging between about 3 and about 15 minutes and a temperature ranging between about 40° F. and about 80° F. so as to form a blended mixture;

(f) allowing the blended mixture to sit quiescently at said temperature for a period ranging between about 15 minutes and about 60 minutes;

(g) heating the blended mixture of step (f) to a temperature ranging between about 140° F. and about 180° F.;

(h) adding a stabilizing hydrocolloid in an amount ranging between about 0.2% wt. and about 2.0% wt. into said liquefier tank (7) while recirculating step (g) mixture in said recirculating loop for a period ranging between about 4 and about 12 minutes so as to form a stabilized mixture;

(i) heating the stabilized mixture to a temperature ranging between about 165° F. and about 190° F.;

(j) adding cultured skim milk solids, salt, sugar, food preservative, texturizing agent, and stabilizing hydrocolloid into liquefier (7) while recirculating said mixture of step (i) in said recirculation loop at said third predetermined temperature so as to form a final mixture; and (k) homogenizing, packaging, and cooling said final mixture by passing said final mixture through a homogenization path (4), (5), (6), (8), (9), and (12) so as to produce said fat-free cream cheese product.

2. The process in accordance with claim 1, wherein said dairy starter culture comprises *Lactococcus lactis* subsp. *cremoris, Leuconostoc mesenteroides* subsp. *cremoris,* and *Lactococcus lactis* subsp. *lactis* biovar diacetylactis.

3. The process in accordance with claim 1, wherein step (e) dry cottage cheese curd ranges between about 40% wt. and about 60% wt.

4. The process in accordance with claim 1, wherein step (e) emulsifying salt ranges between about 0.5% wt. and about 1% wt.

5. The process according to claim 1, wherein step (e) period is about 5 minutes.

6. The process according to claim 1, wherein step (g) temperature is about 160° F.

7. The process according to claim 1, wherein step (f) said period is about 30 minutes.

8. The process according to claim 1, wherein step (i) temperature is about 180° F.

9. The process according to claim 1, wherein said stabilizing hydrocolloid comprises modified food starch, carrageenan, agar, alginate, locust bean gum, or xanthan gum.

10. The process according to claim 1, wherein step (h) stabilizing hydrocolloid comprises xanthan gum.

11. The process in accordance with claim 1, wherein said step (j) stabilizing hydrocolloid is carrageenan.

12. The process in accordance with claim 1, wherein said food preservative comprises calcium propionate, potassium sorbate or sorbic acid.

13. The process in accordance with claim 12, wherein said food preservative is potassium sorbate.

14. The process in accordance with claim 1, wherein said texturizing agent comprises titanium dioxide, tricalcium phosphate or modified food starch.

15. The process in accordance with claim 14, wherein said texturizing agent comprises titanium dioxide.

16. The process in accordance with claim 1, wherein step (e) dry cottage cheese curd is replaced with cultured skim milk curd.

17. The process in accordance with claim 1, wherein said fat free cream cheese product has a lactose content ranging between about 5% wt. and about 9% wt. based on the product weight.

18. Fat free cream cheese product produced by the process of claim 1.

19. The process in accordance with claim 1, wherein said amount of precheese base in step (d) ranges between about 25 wt %. and about 55 wt %.

* * * * *